United States Patent

Kaetsu et al.

[11] 3,983,083
[45] Sept. 28, 1976

[54] SOFT CONTACT LENSES AND PROCESS FOR PREPARATION THEREOF

[75] Inventors: Isao Kaetsu; Minoru Kumakura; Akihiko Ito, all of Takasaki; Yuji Maeda, Tokyo, all of Japan

[73] Assignees: Japan Atomic Energy Research Institute; Tokyo Optical Company Ltd. (Kabushiki Kaisha Tokyo Megane), both of Tokyo, Japan

[22] Filed: Dec. 6, 1974

[21] Appl. No.: 530,119

[30] Foreign Application Priority Data
Dec. 11, 1973 Japan .............................. 48-137380

[52] U.S. Cl. .................... 526/240; 204/159.14; 204/159.21; 204/159.22; 260/630 Y; 351/160; 264/1; 526/273; 526/309; 526/317; 526/320

[51] Int. Cl.² ................... B29D 11/00; C08G 2/00; C08F 218/00; C08F 216/02

[58] Field of Search ......... 260/80.75, 80.72, 86.1 E; 264/1; 204/159.14, 159.21, 159.22

[56] References Cited
UNITED STATES PATENTS

| | | | |
|---|---|---|---|
| 3,496,254 | 2/1970 | Wichterle | 264/1 |
| 3,499,862 | 3/1970 | Wichterle | 264/1 |
| 3,503,942 | 3/1970 | Seiderman | 260/80.75 |
| 3,660,545 | 5/1972 | Wichterle | 260/80.75 |
| 3,700,761 | 10/1972 | O'Driscoll et al. | 264/1 |
| 3,822,089 | 7/1974 | Wichterle | 264/1 |

Primary Examiner—Harry Wong, Jr.
Assistant Examiner—Herbert J. Lilling
Attorney, Agent, or Firm—Ladas, Parry, Von Gehr, Goldsmith & Deschamps

[57] ABSTRACT

Soft contact lenses comprising a copolymer comprising at least one monomer of the general formula,

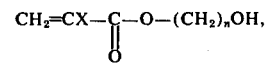

wherein X is H or CH₃ and $n$ is 2 or 3, at least one monomer of the general formula,

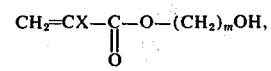

wherein X is H or CH₃ and $m$ is an integer of 4 to 13, and optionally at least one polymerizable monomer other than the monomers of the above-mentioned two groups are disclosed. These contact lenses are soft and flexible in the non-swollen state and are tougher and less susceptible to microbiological contamination than the hitherto known soft contact lenses. Also a novel process for preparation of these soft contact lenses is disclosed, which comprises cast-polymerizing a mixture of the above-mentioned monomers, cooling the resulting copolymer to a low temperature at which it stands rigid, and shaping the copolymer body into the lens form in the cooled rigid state.

6 Claims, No Drawings

SOFT CONTACT LENSES AND PROCESS FOR PREPARATION THEREOF

BACKGROUND OF THE INVENTION

This invention relates to novel soft contact lenses and a novel process for making said soft contact lenses.

It is well known that contact lenses are becoming more and more popular, since they have many advantages over the conventional spectacles. For example, contact lenses are very light, are convenient for wearers in action and movement, are desirable from the viewpoint of personal appearance, and offer eyesight correction over a remarkably broad visual field. Contact lenses have conventionally been made of plastic materials. However, the prior art contact lenses are made of materials mainly comprising methyl methacrylate polymers and thus they are hard. Hence, they often fit poorly over the cornea, cannot be worn for a prolonged period of time, and frequently fail in adaptation causing lacrimation, a feeling of foreign matter, a feeling of dryness and the like. Moreover, polymers of methyl methacrylate do not have sufficient impact resistance, and lenses of these materials are easily broken and are likely to injure the eyes. So, they are not satisfactory from the viewpoint of safety.

Recently, with a view to overcoming these defects of the prior art hard contact lenses, soft contact lenses have been developed, which have far better affinity to the cornea and which give less feeling of foreign matter and/or dryness. Opticians and ophthalmologists have much interest in these soft contact lenses as the means not only for eyesight correction, but also for compensation of aphakia after a cataract operation, as lenses to be used for treatment of eye diseases or to be worn after the treatment of trauma of eyes.

However, the soft contact lenses that have hitherto been developed have very serious defects in quality and are difficult to manufacture, which prevent them from general acceptance. The presently known soft contact lenses are made of hydrophilic polymers, mainly comprising poly(hydroxyethyl methacrylate). These materials absorb water and swell until the equilibrium is attained, and in the wet and swollen state they are soft and flexible. Therefore, the known soft contact lenses are characterized in that they are always used in the swollen state. In such a swollen state, however, high molecular materials generally are markedly reduced in mechanical strength and are extremely fragile. In addition, since they are worn always in the wet and swollen state, these soft contact lenses are easily contaminated with bacteria. Therefore, they need to be sterilized once a day by boiling. This boiling treatment is not only troublesome but often causes decomposition and breakdown of the lens material. Thus the prior art soft contact lenses are very short-lived because of their characteristics of being used in the wet and swollen state. This is a serious practical defect and prevents their wide acceptance.

Also, the prior art soft contact lenses are difficult to manufacture. Although the prior art soft contact lenses are used in the swollen state, the work of shaping and finishing, such as cutting, machining, polishing, etc. must be applied to the polymeric material in the dry state, but it is very difficult to tell beforehand the precise shape, size, curvature and the like which the lense will assume in the swollen state. Also, even a slight variation in the atmosphere or conditions under which polymerization is carried out may results in variation in hydrophilic property and swellability of the product, which makes the quality control extremely difficult. In short, the known process for manufacturing the prior art soft contact lenses is complicated and difficult to control and percentage of rejection is very high.

We have searched for new materials suitable for soft contact lenses and for a manufacturing processes therefor that will not result in the above-mentioned defects in quality and disadvantages in manufacturing, and we have completed this invention.

SUMMARY OF THE INVENTION

According to this invention, soft contact lenses are made of a copolymer derived from a monomer mixture of at least one polymerizable monomer of the general formula

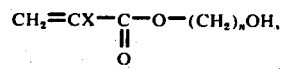

wherein X is H or $CH_3$ and $n$ is 2 or 3 (hereinafter referred to as compound of Group I) and at least one polymerizable monomer of the general formula

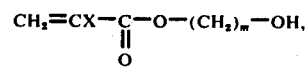

wherein X is H or $CH_3$ and $m$ is an integer of 4 to 13 (hereinafter referred to as compound of Group II) and, if desired, at least one polymerizable monomer other than the above mentioned two groups (hereinafter referred to as compound of Group III), and the ratio of the compound or compounds of Group I and the compound or compounds of Group II is 1:6 to 4:1 by weight, and the proportion of the compound or compounds of Group III is not more than 40 % by weight of the total of the monomers.

Although the soft contact lenses of this invention are hydrophilic, they are non-swellable or less swellable than the prior art soft contact lenses. They do not or little swell upon contact with tear, and yet are soft and flexible.

According to this invention, there is also provided a process for making soft contact lenses which comprises cast-polymerizing a monomer mixture as defined above in a mold of a shape suitable for making contact lenses, cooling the thus obtained copolymer body to a low temperature not higher than 0°C., at which temperature the copolymer body stands in a stiff, rigid state, and subjecting the body to a necessary finish work such as cutting, machining, polishing and the like to complete contact lenses having precisely the desired shape, size and curvature.

Examples of the monomers of Group I used in the invention are hydroxyethyl methacrylate, hydroxyethyl acrylate, hydroxypropyl methacrylate and hydroxypropyl acrylate. Representative of the monomers of Group II are butanediol monomethacrylate, butanediol monoacrylate, pentanediol monomethacrylate, pentanediol monoacrylate, hexanediol monomethacrylate, hexanediol monoacrylate, heptanediol monomethacrylate, heptanediol monoacrylate, nonanediol monomethacrylate, nonanediol monoacrylate, decanediol monomethacrylate, decanediol monoacrylate, undecanediol monomethacrylate, undecanediol monoacrylate, dodecanediol monomethacrylate, dodecanediol monoacrylate, tridecanediol monomethacrylate, and tridecanediol monoacrylate. A compound of Group II wherein $m$ exceeds 13 is not suitable for the purpose of the invention. When $m$ is in excess of 13, polymerizability of the compounds is low and the resulting polymers are poor in transparency and the formed polymers are wax-like.

The compounds of Group I impart hydrophilic property to the resulting polymers and the compounds of Group II impart flexibility and toughness thereto. The mixing ratio of these two components is, on the weight basis, in the range of 1:6 to 4:1, preferably in the range of 1:4 to 2:1, more preferably 1:3.5 to 1:1.

As previously stated, this invention includes the use of polymerizable monomers other than those of Groups I and II (compound of Group III) which are added to a mixture of monomers of Groups I and II, in an amount not exceeding 40 %, preferably 30 – 5 % and more preferably 20 – 10 % of the total weight of the monomers, and the resulting mixture is processed in the same manner as above to make contact lenses.

These monomers of Group III (i.e., monomers other than those of Groups I and II) which can be used in this aspect of the invention are exemplified by methyl methacrylate, ethyl methacrylate, butyl methacrylate, isobutyl methacrylate, lauryl methacrylate, octyl methacrylate, cyclohexyl methacrylate, stearyl methacrylate, 2-ethylhexyl methacrylate, benzyl methacrylate, phenyl methacrylate, glycidyl methacrylate, methyl acrylate, ethyl acrylate, butyl acrylate, octyl acrylate, stearyl acrylate, glycidyl acrylate, methoxybutyl methacrylate, ethoxyethyl methacrylate, acetylmethyl methacrylate, propylbutyl methacrylate, acrylic acid, methacrylic acid, calcium acrylate, barium acrylate, lithium acrylate, sodium acrylate, barium methacrylate, calcium methacrylate, lithium methacrylate, potassium acrylate, acrylamide, methacrylamide, diacetone acrylamide, methylol acrylamide, methylene-bisacrylamide, N-butylacrylamide, N-propylacrylamide, acrylonitrile, methacrylonitrile, vinylpyrrolidone, vinylcarbazole, styrene, α-methylstyrene, vinyltoluene, divinylbenzene, vinyl acetate, vinyl chloride, vinyl propionate, vinyl laurate, vinyl stearate, isobutylene, propylene, ethylene, tetrachloroethylene, trichlorofluoroethylene, ethylene glycol dimethacrylate, propylene glycol dimethacrylate, neopentyl glycol dimethacrylate, diethylene glycol dimethacrylate, triethylene glycol dimethacrylate, butanediol dimethacrylate, pentanediol dimethacrylate, hexanediol dimethacrylate, polyethylene glycol dimethacrylate, ethylene glycol diacrylate, propylene glycol diacrylate, diethylene glycol diacrylate, triethylene glycol diacrylate, neopentyl glycol diacrylate, trimethylolpropane trimethacrylate, butanediol diacrylate, pentanediol diacrylate, hexanediol diacrylate, polyethylene glycol diacrylate and the like.

The Group III monomers include various types of monomers, for example, from those forming water-soluble polymers such as vinylpyrrolidone to those forming rigid polymers such as styrene, and they are added in order to improve or modify the mechanical strength, processability, weather-resisting property, optical properties, flexibility or hydrophilic property of the polymer consisting of monomers of Groups I and II and thus to give to the resulting polymer quantities making it more suitable as a material for contact lenses.

According to this invention, a mixture of monomers of Groups I and II or Groups I, II and III is polymerized to form a material for contact lenses. For this purpose any known polymerization technique may be employed, such as heating with a polymerization catalyst, irradiation with light or an ionizing radiation, application of ultrasonic waves and the like.

The polymerization catalysts which may be employed in the invention include peroxides such as diisopropyl peroxide, di-tert-butyl peroxide, hydrogen peroxide, acetyl peroxide, lauryl peroxide and p,p'-dimethylbenzoyl peroxide; ammonium persulfate and potassium persulfate; azo compounds such as 2,2'-azobisisobutyronitrile, 2,2'-azobis-2-methylvaleronitrile and 1,1'-azobis-1-cyclohexane dinitrile; hydroperoxides such as 2-cyclohexenyl hydroperoxide, 1-methylcyclohexyl hydroperoxide, cumene hydroperoxide and tetraline hydroperoxide; and various redox polymerization catalyst systems.

The kinds of light which may be used in the invention include visible, ultraviolet and natural light in the wave length range of 7000 – 1900A. The ionizing radiations include alpha rays, beta rays, gamma rays, electron beams, X-rays, neutron beams, and mixed radiations from a nuclear reactor, applied at a dose rate in the range of $10^2 - 10^9$ r/hr.

The polymerization may be carried out in a mold having a casting cavity in the shape of rod, cylinder, curved body and the like so as to impart to the resulting polymer a configuration convenient for shaping and finishing procedures to make contact lenses.

The thus obtained polymeric material is soft and flexible per se and can be used as is as soft contact lenses without swelling treatment. However, being soft in itself, this material is difficult to precisely cut, machine and polish and, therefore, cannot directly be subjected to shaping and finishing procedures to make soft contact lenses having precisely the desired shape, size and curvature. One aspect of the present invention is characterized in that the thus obtained polymeric material for soft contact lenses is cooled nearly to the glass transition temperature of the polymer not higher than 0°C to make it rigid and then, in the rigid state, is cut, machined and polished to produce a contact lens with a precise configuration.

In accordance with the process of this invention, it is not necessary to carry out the shaping and finishing work on the lens while in a pre-swollen state, guessing the shape, size and curvature it will take in the swollen state, as in the case of the prior art soft contact lenses. Moreover, since the coefficient of cubic expansion of the polymers used in this invention is very small, there is only extremely small difference in the shape, size and curvature between a lens in the rigid state at lower temperatures and that in the soft state at room temperature. Therefore, in lenses made according to the invention, the shaping and finishing work is remarkably easy and simple, and the shaped and finished lens can be held to within a very low tolerance.

In short the soft contact lenses of this invention have various advantages over the prior art soft contact lenses manufactured in the dry state and used in the swollen state, for example, excellent mechanical strength, less susceptibility to contamination with bacteria, easy handling, remarkably prolonged life, etc., and they are free of almost all the defects of the prior art soft contact lenses.

DETAILED DESCRIPTION OF THE INVENTION

The following examples will further illustrate the invention without limiting it. In the examples, all parts and percentages are based on weight unless otherwise specified.

EXAMPLE 1

A mixture consisting of 20 parts of hydroxyethyl methacrylate, 20 parts of butanediol monomethacrylate and 50 parts of hexanediol monomethacrylate was poured into a cylindrical mold 13.5 mm in inside diameter and 500 mm in length and the mixture was polymerized by irradiating with gamma rays from cobalt-60 at a dose rate of $5 \times 10^4$ r/hr for 40 hours at room temperature. The resulting polymer was removed from the mold and cooled to −78°C., and, while at this temperature, the cylindrical polymer body was then subjected to the finishing work. The polymer was easily cut, machined and polished to produce contact lens for myopia having a power of S-4.50D (S: spherical, D: diopter).

EXAMPLE 2

In a monomer mixture consisting of 30 parts of hydroxypropyl methacrylate, 30 parts of pentanediol monomethacrylate and 40 parts of heptanediol monoacrylate, 0.5 % of azobisisobutyronitrile was dissolved, and the resulting mixture was poured into a mold having a 1 mm thick cavity with curved rough surface and was polymerized by heating at 70°C for 120 minutes and then at 100°C for 60 minutes. The polymer body was then removed from the mold, cooled to −48°C and then finished by machining and polishing to make a contact lens having a power of S-2.25D. Thus a precisely shaped product was obtained with great ease.

EXAMPLE 3

A mixture of 40 parts of hydroxyethyl acrylate and 60 parts of nonanediol monoacrylate was poured into a glass mold shaped to form a contact lens for myopia having a diameter of 12.5 mm and was irradiated from a distance of 10 cm by a light source (a 400 W high pressure mercury lamp supplied by Toshiba) to form a soft polymer. The polymer body was then cooled to −63°C and polished to make a contact lens having a precise configuration providing a power of S-6.25D. Thus, a soft contact lens product was easily obtained.

EXAMPLE 4

To a mixture consisting of 20 parts of hydroxypropyl acrylate, 50 parts of hexanediol monoacrylate and 10 parts of diethylene glycol dimethacrylate, 0.5 % tert-butyl hydroperoxide was added and the resulting mixture was poured into a cylindrical mold 13.5 mm in inside diameter and 300 mm in length and was polymerized by heating at 60°C for 120 minutes and then at 100°C for 80 minutes to obtain a soft polymer. The polymer body was cooled to −30°C, cut into the shape of a contact lens and then machined and polished to impart precise size, curvature and optical surface configuration as a lens for myopia having a power of S-7.25D. Thus, a contact lens was made with ease.

EXAMPLE 5

Thirty (30) parts of hydroxyethyl methacrylate, 50 parts of hexanediol monomethacrylate and 20 parts of methyl methacrylate are mixed, and the thus obtained homogeneous composition is cooled to −48°C to form a viscous supercooled liquid, which is then poured in a glass vat to form a liquid layer of 3 mm thickness. The liquid layer is irradiated with a dose equivalent to about 2.5 megaroentgen of electron beams from a Cockcroft-Walton type electron accelerator of 3 MeV in energy and 2 mA in beam current to obtain a contact lens material having flexibility and affinity to the cornea. After being cooled to 0°C, this material was machined and polished to impart the shape, size and surface configuration of a contact lens having a power of S-6.0D, whereby the desired soft contact lens was readily obtained.

EXAMPLE 6

Twenty (20) parts of hydroxypropyl methacrylate, 40 parts of heptanediol monomethacrylate, 10 parts of triethylene glycol dimethacrylate and 10 parts of styrene were mixed. After 0.5 % of cumene peroxide was added thereto, the mixture was polymerized in a cylindrical mold having inside diameter of 13.5 mm and length of 300 mm by heating at 60°C for 180 minutes and then at 100°C for 120 minutes to form a soft copolymer. The thus obtained copolymer was gradually cooled with liquid nitrogen and was subjected to machining to impart the configuration and size as a contact lens having a power of S-1.50D by surface polishing. Thus a completely finished contact lens product was obtained.

What we claim is:

1. Soft contact lenses consisting essentially of copolymer derived from a monomer mixture of at least one polymerizable monomer of the general formula,

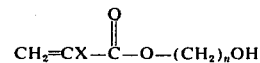

wherein X is a member selected from a group consisting of H and $CH_3$ and $n$ is either of 2 or 3 and at least one polymerizable monomer of the general formula

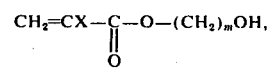

wherein X is a member selected from a group consisting of H and $CH_3$ and $m$ is an integer of 4 to 13, whereby the mixing ratio of the monomer or monomers of the first group and the monomer or monomers of the second group is 1:6 to 4:1 by weight.

2. Soft contact lenses consisting essentially of copolymer derived from a monomer mixture of at least one polymerizable monomer of the general formula,

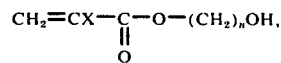

wherein X is a member selected from a group consisting of H and $CH_3$ and $n$ is either of 2 or 3 and at least one polymerizable monomer of the general formula

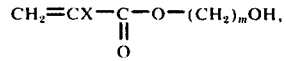

wherein X is a member selected from a group consisting of H and CH$_3$ and $m$ is an integer of 4 to 13, whereby the mixing ratio of the monomer or monomers of the first group and the monomer or monomers of the second group is 1:6 to 4:1 by weight, wherein said copolymer further contains at least one further polymerizable monomer selected from the group consisting of acrylate and methacrylate of an alkyl containing up to 18 carbon atoms; acrylate and methacrylate of a cycloalkyl containing up to 8 carbon atoms; glycidyl acrylate and methacrylate; acrylate and methacrylate of aralkyl and aryl containing up to 8 carbon atoms; lower-alkoxy-lower alkyl acrylate and methacrylate; acrylic acid; methacrylic acid; alkali metal acrylate; lower-acyl acrylate and methacrylate, alkaline earth metal acrylate and methacrylate; styrene, alphamethylstyrene, vinyltoluene, divinylbenzene, vinyl chloride, vinyl esters of carboxylic acids containing up to 18 carbon atoms; alkanediol dimethacrylates and diacrylate, said alkane diol containing up to 10 carbon atoms; polyethylene glycol diacrylate and dimethacrylate; trimethylolpropane trimethacrylate, whereby the content of the said third monomer or monomers does not exceed 40% by weight of the amount of the total monomer mixture.

3. The soft contact lenses as claimed in claim 2, whereby the content of said third group monomer is 30–5% by weight of the amount of the total monomer mixture.

4. The soft contact lenses as claimed in claim 2, wherein the mixing ratio of the first group monomer and the second group monomer is 1:3.5 to 1:1 by weight, and the third group monomer is selected from the group consisting of lower alkyl acrylate and methacrylate, styrene and di-, tri- and tetraethylene glycol diacrylate and dimethacrylate, whereby the content of the third group monomer is 20–10% by weight of the amount of the total monomeric mixture.

5. A process for making soft contact lenses comprising cast polymerizing a monomer mixture as defined in claim 1, cooling the resulting copolymer body to a temperature not higher than 0°C, at which it stands in a rigid state, and shaping said body into the lens form in the cooled rigid state.

6. A process for making soft contact lenses comprising cast-polymerizing a monomer mixture as defined in claim 4 cooling the resulting copolymer body to a temperature not higher than 0°C. at which it stands in a rigid state and shaping said body into the lens form in the cooled rigid state.

* * * * *